Dec. 31, 1940.                    L. D. STURM                    2,227,111
BALL BEARING SCREW JACK
Filed Oct. 11, 1938
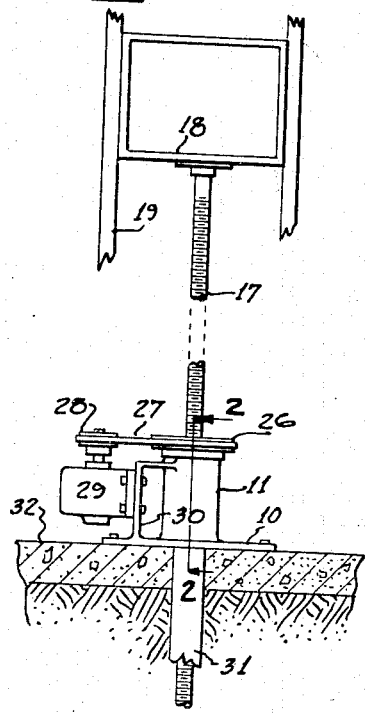
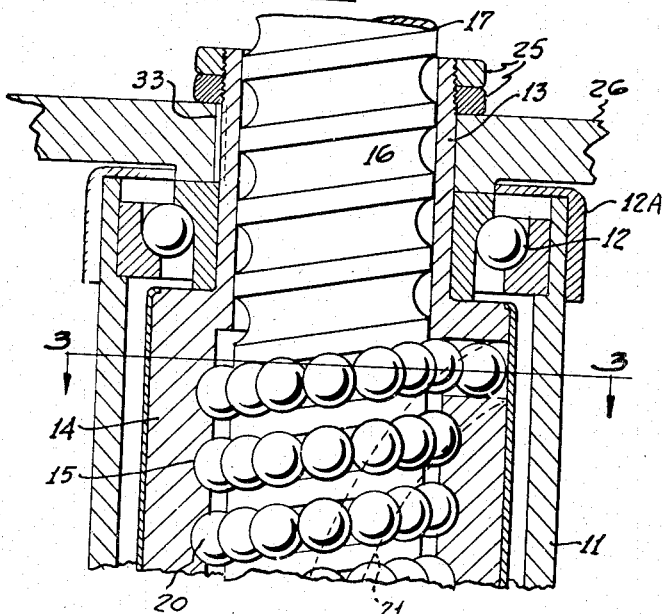
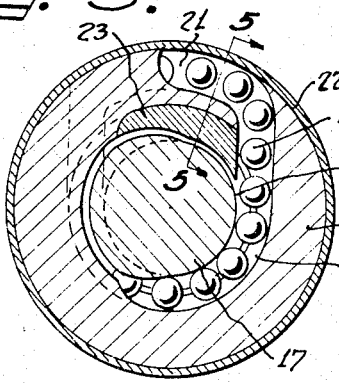
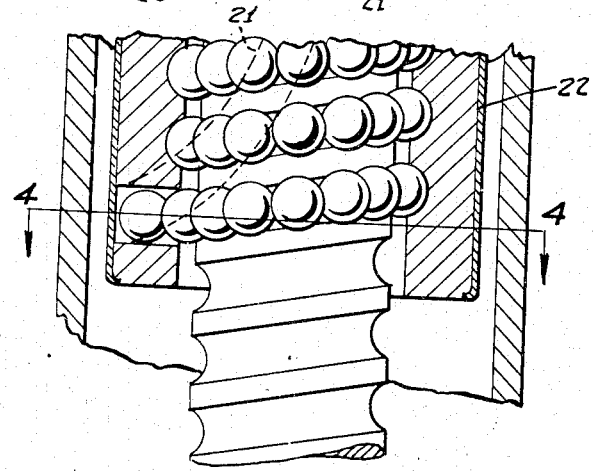
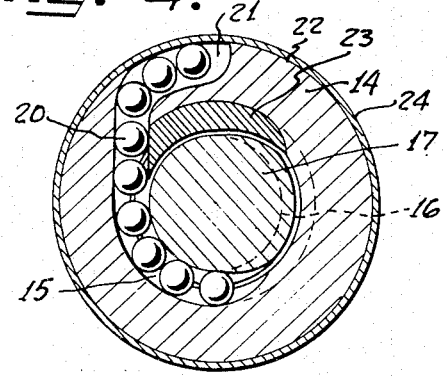
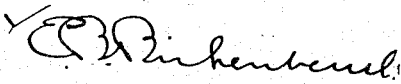
INVENTOR
L. D. STURM
ATTORNEY Patented Dec. 31, 1940

2,227,111

UNITED STATES PATENT OFFICE 2,227,111

BALL BEARING SCREW JACK

Lewis D. Sturm, Portland, Oreg.

Application October 11, 1938, Serial No. 234,381

1 Claim. (Cl. 254—98)

This invention relates generally to screw jacks, and particularly to a ball bearing screw jack especially adapted for use in connection with elevators.

The main object of this invention is to construct a screw jack in which the friction is reduced to a minimum.

The second object is to construct a screw jack which will be especially adapted for use in connection with elevators, automobile hoists and similar contrivances.

The third object is to construct a jack in which the power requirements will be held to a minimum.

These and other objects are accomplished in the manner set forth in the following specification as illustrated in the accompanying drawing, in which:

Fig. 1 is a side elevation of the device showing its application to a lift and showing the foundation broken away in section.

Fig. 2 is an enlarged section taken along the line 2—2 in Fig. 1.

Fig. 3 is a transverse section taken along the line 3—3 in Fig. 2.

Fig. 4 is a transverse section taken along the line 4—4 in Fig. 2.

Fig. 5 is a section taken along the line 5—5 in Fig. 3.

Similar numerals refer to similar parts throughout the several views.

Referring in detail to the drawing, there is shown a base 10 upon which is formed a cylindrical housing 11 in the upper end of which is placed an anti-friction bearing 12. Through the bearing 12 extends the sleeve 13 of the rotatable nut 14 which is provided with the spiral groove 15 which conforms in shape to the spiral groove 16 formed within the screw 17 whose upper end is attached to the lift 18 which slides between the guides 19. Spherical ball bearings 20 occupy the groove 15 and the adjacent portion of the groove 16. A cap 12—A covers the bearing 12.

A channel 21 is formed in the outer surface 22 of the nut 14 and communicates between the uppermost and lowermost portions of the ball bearing portions of the grooves 15 and 16.

A deflector 23 is secured within the nut 14 and its purpose is to steer the ball bearings 20 out of the spiral groove into the channel 21. A sleeve 24 covers the nut 14 and forms a closure for the channel 21.

The bearing 12 is a combined radial and thrust bearing and takes the actual load in a vertical direction. On the sleeve 13 are secured the nuts 25 above the belt pulley 26 which is driven through the belt 27 from the pulley 28, which in turn is operated by the motor 29 which is mounted on the bracket 30 of the housing 11.

It will be understood that the screw 17 is confined within the tube 31 and extends downwardly from the housing 11 into the floor 32.

In the operation of the device when it is desired to raise the lift 18, the motor 29 is operated in a suitable direction. Through the belt 27, the pulley 26 is rotated correspondingly and since it is secured to the sleeve 13 by means of the key 33, it follows that the nut 14 must also rotate. Since the ball bearings 20 can travel around the groove 15 and back to the point of beginning, it follows that all of the end thrust exerted against the screw 17 will be transmitted in the proper direction, and since the pulley 26 is secured to the sleeve 13 by means of the key 33, it follows that the nut 14 is correspondingly rotated and the screw 17 raised or lowered as desired.

By the use of this device a large portion of the usual friction losses is eliminated and an exceedingly free running jack is produced.

I claim:

A screw jack having a lift, an upright guide for said lift, a base disposed under said lift, an upright housing mounted on said base, an antifriction bearing disposed at the top of said housing and having a vertical axis, a rotatable nut suspended from said bearing within said housing, said nut having a central opening formed therein provided with a helical groove the opposite ends of which are joined by a channel formed in the exterior of the nut, a cylindrical sleeve disposed around said nut forming a cover for said channel, a plurality of ball bearings occupying said groove and channel, the balls in the groove projecting into the nut openings to form an antifriction thread, a non-rotatable vertical load supporting screw passing through said nut and having a spiral groove formed around same into which said balls project, the upper end of said screw being attached to said lift and means for rotating said nut, said screw projecting above and below said base at all times.

LEWIS D. STURM.